United States Patent
Bensberg et al.

(10) Patent No.: US 12,481,656 B2
(45) Date of Patent: Nov. 25, 2025

(54) BLOOM FILTER FOR AVOIDING PARTITION LOADING

(71) Applicant: SAP SE, Walldorf (DE)

(72) Inventors: Christian Bensberg, Heidelberg (DE); Kai Stammerjohann, Wiesloch (DE); Frederik Transier, Bammental (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/221,753

(22) Filed: Jul. 13, 2023

(65) Prior Publication Data
US 2025/0021562 A1   Jan. 16, 2025

(51) Int. Cl.
   *G06F 16/00*    (2019.01)
   *G06F 16/2455*  (2019.01)
   *G06F 16/334*   (2025.01)

(52) U.S. Cl.
   CPC ........ *G06F 16/2455* (2019.01); *G06F 16/334* (2019.01)

(58) Field of Classification Search
   CPC .......................... G06F 16/2455; G06F 16/334
   See application file for complete search history.

(56) References Cited

U.S. PATENT DOCUMENTS

| | | | |
|---|---|---|---|
| 8,065,316 B1 | 11/2011 | Baker et al. | |
| 9,367,574 B2* | 6/2016 | Gupta | G06F 16/283 |
| 10,769,150 B1* | 9/2020 | Cruanes | G06F 16/283 |
| 11,188,535 B2 | 11/2021 | Chen | |
| 11,347,808 B1 | 5/2022 | Plenderleith et al. | |
| 2008/0147714 A1* | 6/2008 | Breternitz | G06F 12/0864 707/999.102 |
| 2009/0037500 A1* | 2/2009 | Kirshenbaum | G06F 16/137 |
| 2012/0011150 A1 | 1/2012 | Swaminathan et al. | |
| 2013/0297694 A1 | 11/2013 | Ghosh | |
| 2018/0034849 A1 | 2/2018 | Huston, III et al. | |
| 2018/0157716 A1 | 6/2018 | Constandt et al. | |
| 2020/0278977 A1 | 9/2020 | Halstead et al. | |
| 2021/0286793 A1* | 9/2021 | OKeeffe | G06F 16/24558 |
| 2021/0303564 A1 | 9/2021 | Mahale et al. | |
| 2022/0222298 A1* | 7/2022 | Chen | G06F 16/2379 |
| 2022/0284025 A1* | 9/2022 | Adams | G06F 16/2272 |
| 2023/0119688 A1* | 4/2023 | Huang | G06F 21/72 726/27 |

FOREIGN PATENT DOCUMENTS

| | | | | |
|---|---|---|---|---|
| CN | 113051351 A | * | 6/2021 | ........... G06F 16/221 |
| CN | 113297211 A | * | 8/2021 | ......... G06F 16/2255 |
| CN | 113312313 A | * | 8/2021 | ............. G06F 16/13 |
| TW | I716016 B | * | 1/2021 | ....... G06F 16/24537 |

OTHER PUBLICATIONS

Bensberg, C. et al., Unpublished U.S. Appl. No. 18/221,757, filed Jul. 13, 2023, entitled "Used Identifier Cache".

* cited by examiner

*Primary Examiner* — Alexander Khong
(74) *Attorney, Agent, or Firm* — Sterne, Kessler, Goldstein & Fox P.L.L.C.

(57) ABSTRACT

Embodiments are described for a database management system comprising a memory and at least one processor coupled to the memory. The at least one processor is configured to receive a query that corresponds to a data slice and determine a bloom filter based on the query. The at least one processor is further configured to determine that the data slice includes data requested by the query based on the bloom filter and in response to determining that the data slice includes the data requested by the query, load the data slice to the memory.

20 Claims, 8 Drawing Sheets

BLOOM FILTER FOR AVOIDING PARTITION LOADING

CROSS-REFERENCE TO RELATED APPLICATIONS

This application is related to U.S. patent application Ser. No. 18/221,757, titled "USED IDENTIFIER CACHE", filed Jul. 13, 2023, which is herein incorporated by reference in its entirety.

BACKGROUND

A system may receive queries to retrieve data stored in a disk. In some embodiments, a query may indicate data requested and a portion of data in the disk, such as a data slice or micro-partition. Thus, the system may load the portion of data from the disk to a memory of the system and may retrieve the data from the portion of data after loading. In some embodiments, the operation of loading the portion of data from the disk to the memory is time-consuming and requires additional resources. Thus, optimizing the efficiency of the loading operation is needed.

SUMMARY

Some embodiments of this disclosure relate to apparatus, system, computer program product, and method embodiments for implementing a used identifier cache and an efficient loading operation.

Some embodiments of this disclosure provide a system comprising a memory and at least one processor coupled to the memory. The at least one processor is configured to receive a plurality of queries and determine a first identifier based on the plurality of queries. The at least one processor is further configured to create a first bloom filter based on the first identifier and receive an additional query corresponding to the first identifier. The at least one processor is further configured to execute the first bloom filter.

Some embodiments of this disclosure provide a computer-implemented method. The method comprises receiving a plurality of queries and determining a first identifier based on the plurality of queries. The method further comprises creating a first bloom filter based on the first identifier and receiving an addition query corresponding to the first identifier. The method further comprises executing the first bloom filter.

Some embodiments of this disclosure provide a non-transitory computer-readable medium (CRM) comprising instructions to, when executed by at least one computing device, causes the at least one computing device to perform operations. The operations comprise receiving a plurality of queries and determining a first identifier based on the plurality of queries. The operations further comprise creating a first bloom filter based on the first identifier and receiving an addition query corresponding to the first identifier. The operations further comprise executing the first bloom filter.

This Summary is provided merely for the purposes of illustrating some embodiments to provide an understanding of the subject matter described herein. Accordingly, the above-described features are merely examples and should not be construed to narrow the scope or spirit of the subject matter in this disclosure. Other features, embodiments, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
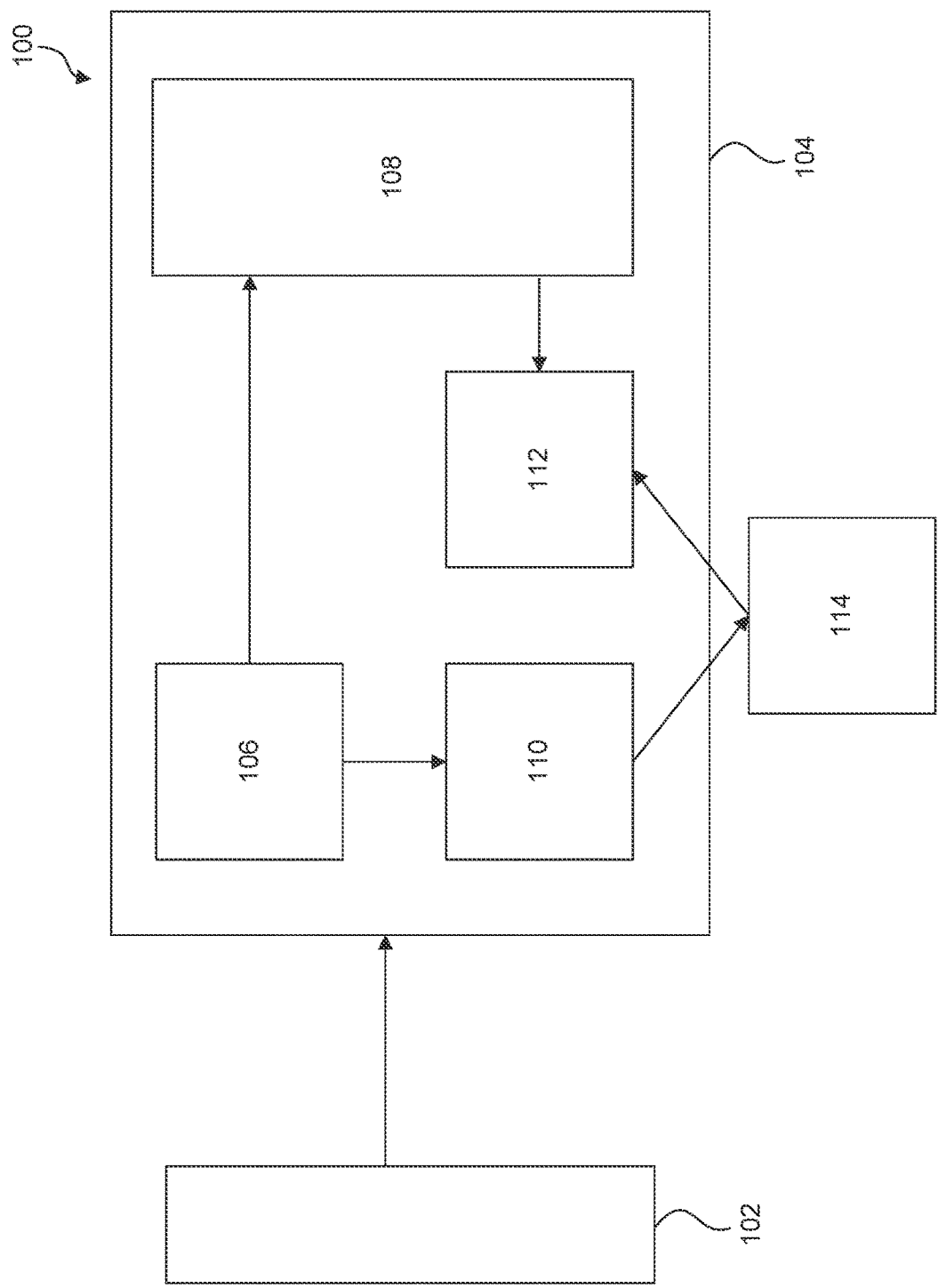
FIG. 1 illustrates an example system implementing a used identifier cache and an efficient loading operation, according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatus, system, computer program product, and method embodiments for implementing a used identifier cache and an efficient loading operation.

In some embodiments, a system, such as a computer system or a data storage system, may receive a query to retrieve data. The query may be transmitted by a user device via wireless communication links or wired communication links. The query may indicate a portion of data stored in a disk of the system that may include the data requested. For example, the query may indicate a row of data in the disk. In such a case, the system may load the row of data from the disk to a memory of the system. The data requested may be included in one or more columns of the row of data that is loaded from the disk to the memory. For another example, the query may indicate a page of data in the disk. In such a case, the system may load the page of data from the disk to the memory of the system. The data requested may be included in a page of data, but the page of data may also include additional data that are not requested by the query. For yet another example, the query may indicate a data slice in the disk. In such a case, the system may load the data slice, which may include the data requested data and also additional data. Thus, in any of the cases above, the portion of data loaded from the disk to the memory may or may not include the data requested and may include additional data that are not requested.

In some embodiments, the operation of loading the portion of data is costly. For example, loading the portion of data can be time-consuming and requires memory space to store the portion of data. The system can determine whether the data requested is included in the portion of data after the system loads the portion of data from the disk to the memory. However, if the portion of data does not include the data requested, the loading operation is unnecessary and could have been avoided. In some embodiments, the system can check whether the portion of data includes the data requested by the query prior to loading the portion of data. For example, the query may indicate an identifier of the data request, such as an index of the data requested. The index can correspond to time. In such a case, the system can employ a min/max filter to determine whether the portion of data includes the data request with the index indicated. For example, the system may determine that the data requested is not included in the portion of data. Thus, the system can refrain from loading the portion of data and thus can save time and memory resources.

In some embodiments, the identifier of the data indicated by the queries may not be an index. For example, the identifier may be a city name. In such a case, the min/max filter may be inapplicable. In some embodiments, the system can employ one or more bloom filters for this situation. A bloom filter can be created for each portion of data and directed to one or more identifiers. For example, the bloom filter can be directed to a data slice and is directed to city names and order identification (ID). When the system receives a query that indicates the data slice and a city name, the system can execute the bloom filter with the city name. The bloom filter can return a result of whether data including the city name might be in the data slice. The system can load the data slice if the data slice includes the data with the city name. Otherwise, the system can refrain from loading the data slices. It is worth noting that the bloom filter may give false positive results with a probability, but not false negative results. For example, the bloom filter may indicate that the data with the city name is in the data slice, but the data slice does not include such data. In this case, the system may load the data slice and determines that the data requested is not in the data slices after loading. On the other hand, if the bloom filter indicates that the data slice does not include the data requested, it is certain that the data requested is not in the data slice and the system should refrain from loading the data slices. In summary, the bloom filter can avoid unnecessary loading operations with the probability, but will not falsely prevent loading data slices that include requested data.

In some embodiments, the bloom filter requires resources to create and maintain. For example, the bloom filter can be created and stored in the memory or a cache, which requires data storage resources. In addition, the bloom filter needs to be continuously maintained and updated, which requires computational resources. Thus, efficient bloom filter management is required. In some embodiments, a bloom filter is specific to identifiers. For example, a bloom filter with two identifiers requires fewer resources than a bloom filter with three identifiers. Thus, it is beneficial to limit the number of identifiers of a bloom filter. In some embodiments, the system can determine a predetermined number of identifiers that are frequently used and create a bloom filter directing to these identifiers. In other embodiments, the system can determine identifiers that were used frequently in the past and create a bloom filter directing to these identifiers. In either case, the system needs to know identifiers that were used and indicated by queries in the past.

In some embodiments, the system can create and maintain a used identifier cache to facilitate the efficient bloom filter management. The used identifier cache can record identifiers indicated by each data slice in the past. The used identifier cache can also indicate times when the identifiers were indicated in queries. In such a case, the system can determine what are the more important and/or relevant identifiers and create bloom filters to assist queries with these identifiers.

FIG. 1 illustrates an example system implementing a used identifier cache and an efficient loading operation, according to some embodiments of the disclosure. The example system 100 is provided for the purpose of illustration only and does not limit the disclosed embodiments. The example system 100 may include, but is not limited to, an index server 102, a document store process 104, and a bloom filter cache 114. In some embodiments, the document store process 104 may also include an execution unit 106, a storage 108, a bloom filter writer 110, and a persistence handler 112. The storage 108 can include one or more disk storages and/or one or more caches. The document store process 104 may include, but is not limited to, computer systems, servers, cloud systems, cloud servers, laptops, desktops, personal computers, and the like. In some embodiments, the index server 102, the document store process 104, and the bloom filter cache 114 can be located in different hardware devices or a same hardware device. For example, the index server 102, the document store process 104, and the bloom filter cache 114 can form a distributed system. The index server 102 may be located in a cloud server and connect with the document store process 104 via the Internet. For another example, the index server 102, the document store process 104, and the bloom filter cache 114 can be located in a server, a computer system, and/or a database management system.

In some embodiments, the index server 102 can manage and provide data retrieval process. For example, the index server 102 can receive one or more queries, which request to retrieve data from the document store process 104. The index server 102 can receive the one or more queries from a user or a user device via wireless communication links or wired communication links. In some embodiments, the index server 102 can generate logical execution plans based on the one or more queries. For example, the logical execution plans can indicate high-level logical steps required to execute the one or more queries. The index server 102 can transmit the logical execution plans to the document store process 104. In other embodiments, the index server 102 can transmit the one or more queries and/or the logical execution plans to the document store process 104. The index server 102 can transmit to the document store process 104 via one or more communication links. In some embodiments, the document store process 104 or the execution unit 106 can generate physical execution plans and/or execute the one or more queries to retrieve the data requested. In some embodiments, the document store process 104 or the execution unit 106 can determine one or more portions of data stored in the storage 108 that correspond to the data requested. For example, the document store process 104 or the execution unit 106 can determine that one or more data slices corresponding to the data requested using the one or more queries respectively. In some embodiments, the persistence handler 112 can load the one or more data slices from the storage 108 to a memory. The memory can be included in the document store process 104 or the persistence handler 112. In some embodiments, the persistence handler 112 can retrieve the data requested from the one or more data slices loaded from the storage 108 and return the data requested to the user or the user device.

In some embodiments, the one or more data slices may not include the data requested by the one or more queries. For example, a query may indicate requested data and a data slice corresponding to the requested data. In such a case, the persistence handler 112 can load the data slice into the memory. However, the data slice loaded may not include the data requested. This is possible for several reasons. For example, the data slice may have changed over time. Thus, the data slice may include the requested data in the past, but the requested data may be removed later and not available anymore. For another example, the user or the user device may provide inaccurate information in the query regarding the data slice. In either case, the persistence handler 112 may have loaded the data slice but not be able to retrieve the requested data. Such a load operation can be avoided to save resources because it is not necessary.

In some embodiments, the bloom filter writer 110 can create a bloom filter for the data slice and store it in the bloom filter cache 114. When the document store process 104 determines that the queries indicate the data slice, the document store process 104 can execute the bloom filter and can determine whether the requested data is included in the data slice. If the document store process 104 determines that the data slice includes the requested data, the persistence handler 112 can load the data slice into the memory. Otherwise, the persistence handler 112 can refrain from loading the data slice. In some embodiments, if the requested data is not found, it is not included in a result set that is returned to the user device. The bloom filter and the used identifier cache are transparent optimizations that are not noticeable to users.

In some embodiments, the bloom filter writer 110 can create the bloom filter with one or more identifiers. For example, the one or more identifiers can include a city name and the bloom filter corresponding to the data slice may include the city name identifier. The query received by the index server may indicate that the request data include "New York City." In such a case, the document store process 104 can execute the bloom filter to determine whether the data slice includes a city name as "New York City." However, the bloom filter includes limited identifiers because a bloom filter with more identifiers requires more resources to create and maintain. Thus, the bloom filter writer 110 determines how many and/or which identifiers are to be included in a bloom filter. In some embodiments, the bloom filter writer 110 can make such a determination based on a used identifier cache. In some embodiments, the execution unit 106 can include a used identifier cache. Every time the document store process 104 executes a query, the used identifier cache can record one or more identifiers that were used in the query being executed. For example, the document store process 104 may receive a plurality of queries from the index server 102 or the user device. The plurality of queries may request data from a data slice in the storage 108. The document store process 104 may determine one or more identifiers based on the plurality of queries, wherein each of the one or more identifiers corresponds to at least one of the plurality of queries. The document store process 104 may then determine numbers of queries that respectively correspond to each of the one or more identifiers. Finally, the document store process 104 can store the one or more identifiers and their respective numbers of queries in the used identifier cache. In such a case, the bloom filter writer 110 can select one or more identifiers for a bloom filter of the data slice based on numbers of times that identifiers were used in the past.

It is worth noting that the storage 108 may include a plurality of data slices. In some embodiments, the bloom filter writer 110 can create a plurality of bloom filters for the plurality of data slices. When the document store process 104 receives the plurality of queries, the document store process 104 can execute the plurality of bloom filters to identify which, if any, data slices may include the requested data. The persistence handler 112 then loads the identified data slices into the memory.

Figure 2:
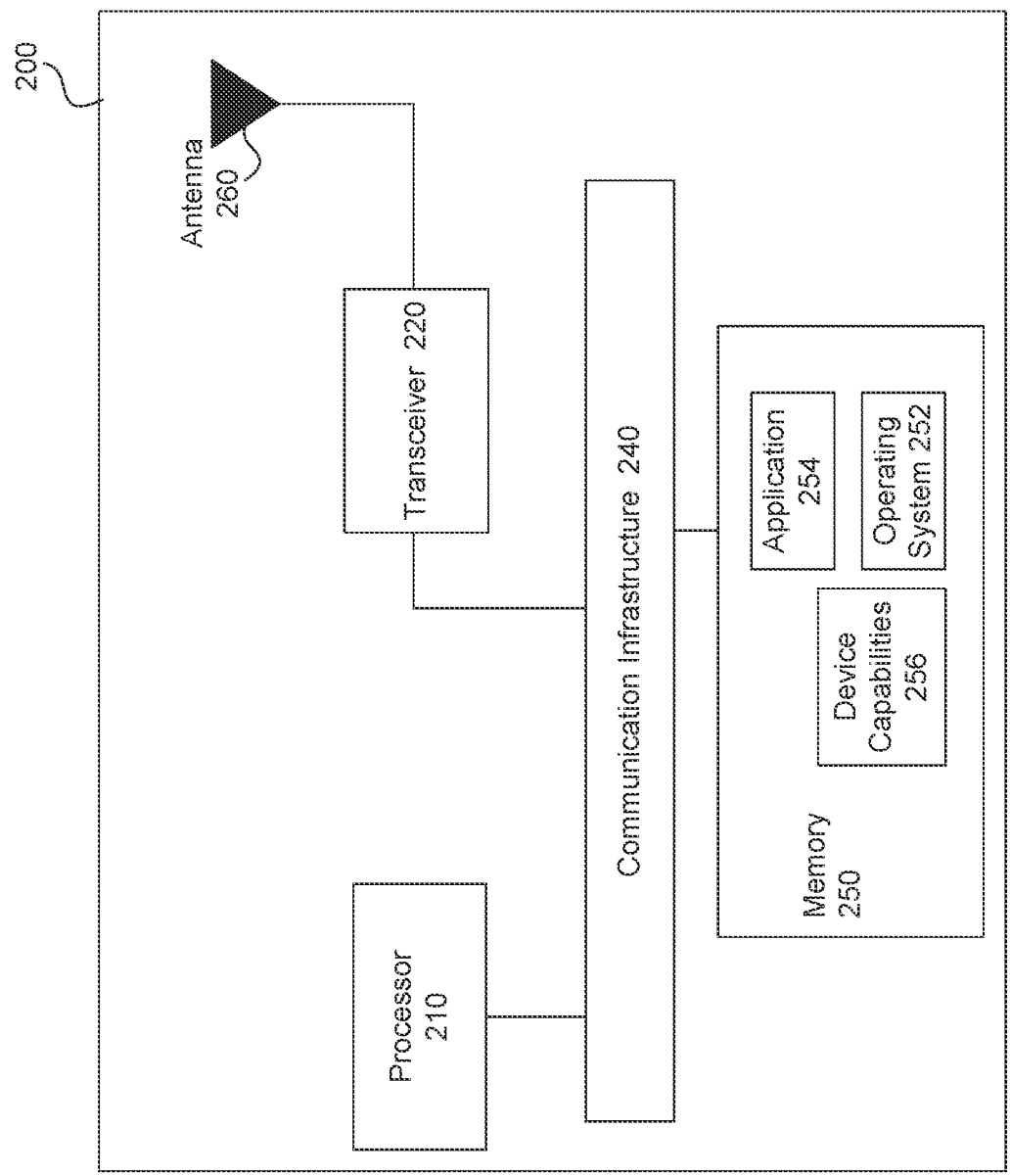
FIG. 2 illustrates a block diagram of an example system implementing a used identifier cache and an efficient loading operation, according to some embodiments of the disclosure.

FIG. 2 illustrates a block diagram of an electronic device 200 implementing a used identifier cache and an efficient loading operation, according to some embodiments of the disclosure. The electronic device 200 may be any of the electronic devices (e.g., the index server 102, the document store process 104, the bloom filter cache 114, or a combination thereof of FIG. 1) of the system 100. The electronic device 200 includes a processor 210, one or more transceivers 220, a communication infrastructure 240, a memory 250, an operating system 252, an application 254, device capabilities 256, and antenna 260. Illustrated systems are provided as exemplary parts of electronic device 200, and electronic device 200 may include other circuit(s) and subsystem(s). Also, although the systems of electronic device 200 are illustrated as separate components, the embodiments of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by the electronic device 200 and/or a user of the electronic device 200. The application 254 may include functions such as, but not limited to, radio streaming, video streaming, remote control, and/or other user functions. In some embodiments, the device capabilities 256 may be stored in the memory 250.

The electronic device 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling electronic device 200 of the system 100 to implement mechanisms for the used identifier cache and the efficient loading operation, as described herein. Alternatively, or additionally, the processor 210 can be "hard coded" to implement mechanisms for the used identifier cache and the efficient loading operation, as described herein.

The one or more transceivers 220 transmit and receive communications signals support mechanisms for the used identifier cache and the efficient loading operation. Additionally, the one or more transceivers 220 transmit and receive communications signals that support mechanisms for measuring communication link(s), generating and transmitting system information, and receiving the system information. According to some embodiments, the one or more transceivers 220 may be coupled to the antenna 260 to wirelessly transmit and receive the communication signals. The antenna 260 may include one or more antennas that may be the same or different types and can form one or more antenna ports. The one or more transceivers 220 allow electronic device 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some embodiments of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver. Additionally, the one or more the transceivers 220 may include one or more circuits (including a cellular transceiver) for connecting to and communicating on cellular networks.

As discussed in more detail below with respect to FIGS. 3-8, processor 210 may implement different mechanisms for the reference signal configuration procedure as discussed with respect to the system 100 of FIG. 1.

Figure 3:
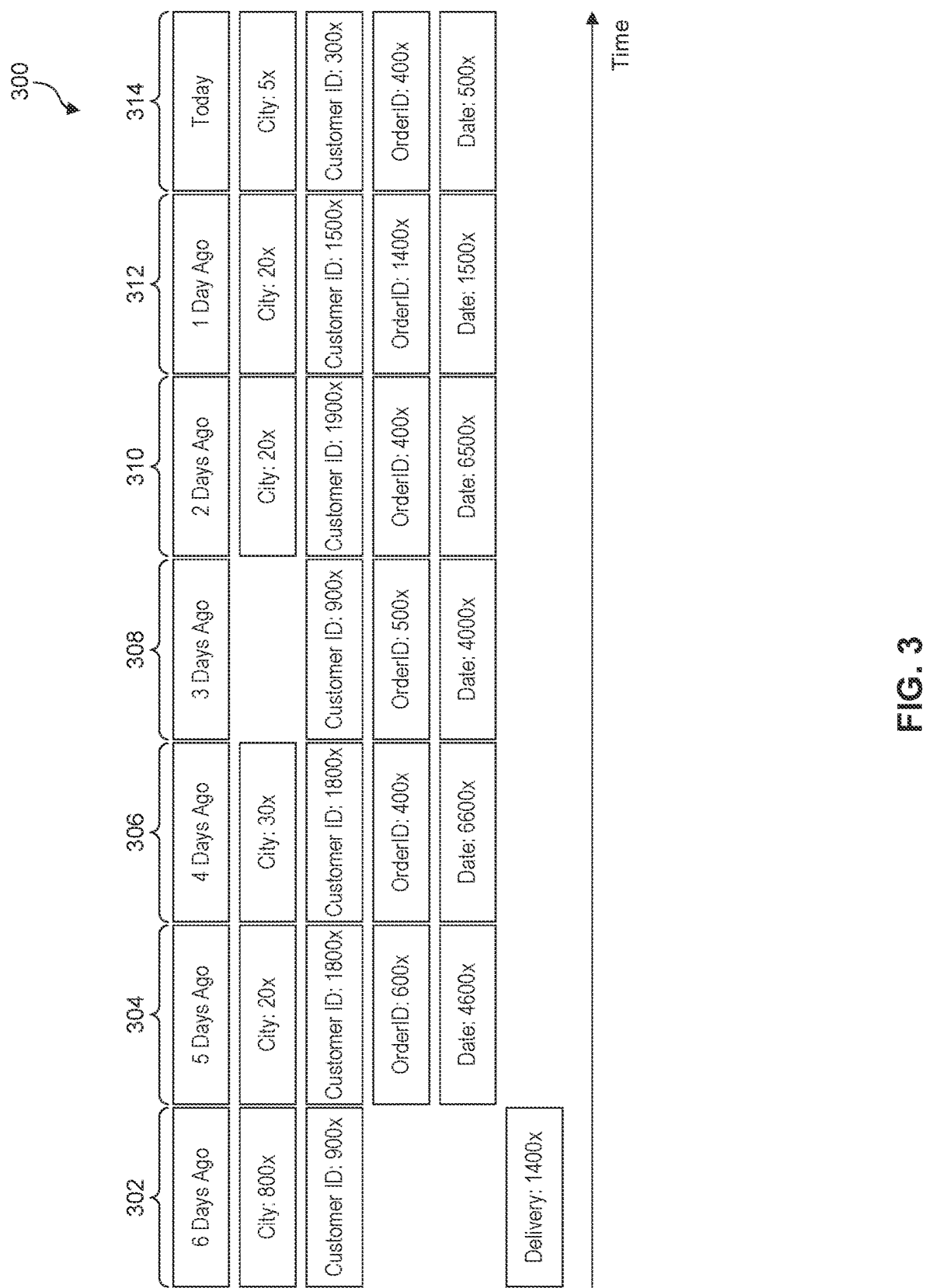
FIG. 3 illustrates an example of a used identifier cache by time, according to some embodiments of the disclosure.

FIG. 3 illustrates an example 300 of a used identifier cache by time, according to some embodiments of the disclosure. As a convenience and not a limitation, FIG. 3 may be described with regard to elements of FIGS. 1, 2, and 8. The example 300 may represent the operation of devices (e.g., the index server 102, the document store process 104, the bloom filter cache 114, or a combination thereof of FIG. 1) implementing the used identifier cache and the efficient loading operation. The example 300 may also be performed by computer system 800 of FIG. 8. But the example 300 is not limited to the specific embodiments depicted in those figures and other systems may be used to perform the method, as will be understood by those skilled in the art. It is to be appreciated that not all operations may be needed, and the operations may not be performed in the same order as shown in FIG. 3.

In some embodiments, the example 300 can include one or more cache units, each of which includes numbers of identifiers used for a day in the past. For example, a cache unit 302 indicates that 6 days ago, identifiers "City," "Customer ID," and "Delivery," were used. In addition, the identifier "City" was used 800 times; the identifier "Customer ID" was used 900 times, and the identifier "Delivery" was used 1400 times. Similarly, a cache unit 304 indicates that 5 days ago, identifiers "City," "Customer ID," "Order ID," and "Date" were used by various number of times. Cache units 306, 308, 310, 312, and 314 also indicate identifiers used in their respective dates. In some embodiments, a system, such as the system 100 of FIG. 1, may define a predetermined time period to be relevant. For example, the system may define the predetermined time period to be 5 days. Thus, identifiers indicated in the cache units 306, 308, 310, 312, and 314 are relevant and can be used by a bloom filter writer, such as the bloom filter 110 in FIG. 1, to create bloom filters. On the other hand, identifiers indicated in the cache units 302 and 304 are not relevant and are not used to create bloom filters. Furthermore, the system requires used identifiers information of at least one day to be able to create bloom filters. In other words, a length of the predetermined time period is at least one day and the system requires at least information in the cache unit 314 to create a bloom filter.

In some embodiments, the bloom filter writer may determine that in the past 5 days, the identifier "City" was used 75 times; the identifier "Customer ID" was used 6500 times; the identifier "OrderID" was used 3100 times; and the identifier "Date" was used 18900 times. The bloom filter writer may create a bloom filter with one or more identifiers. For example, the bloom filter may create the bloom filter with three identifiers. In such a case, the identifiers "Customer ID," "OrderID," and "Date," would be included in the bloom filter because they are used more than the identifier "City." Thus, when a query request for data with a specific "Customer ID," a document store process, such as the document store process 104, can execute the bloom filter to determine whether a data slice indicated by the query includes the data corresponding to the specific "Customer ID." In this way, the document store process can determine whether to load the data slice to avoid potential unnecessary loading operations. On the other hand, the query may request for data with a specific "Delivery" information or "City." However, since the bloom filter does not include such an identifier, the document store process would not be able to determine whether the requested data is in the data slice. Thus, a persistence handler, such as the persistence handler 112 may load the data slice without knowing whether the requested data is available in the data slice.

In some embodiments, the bloom filter writer may create the bloom filter with one or more identifiers that were used more than a predetermined number of times. For example, the predetermined number may be 5000. Thus, the bloom filter writer may create the bloom filter with the identifiers "Customer ID" and "Date," but without identifiers "City" and "OrderID."

Figure 4:
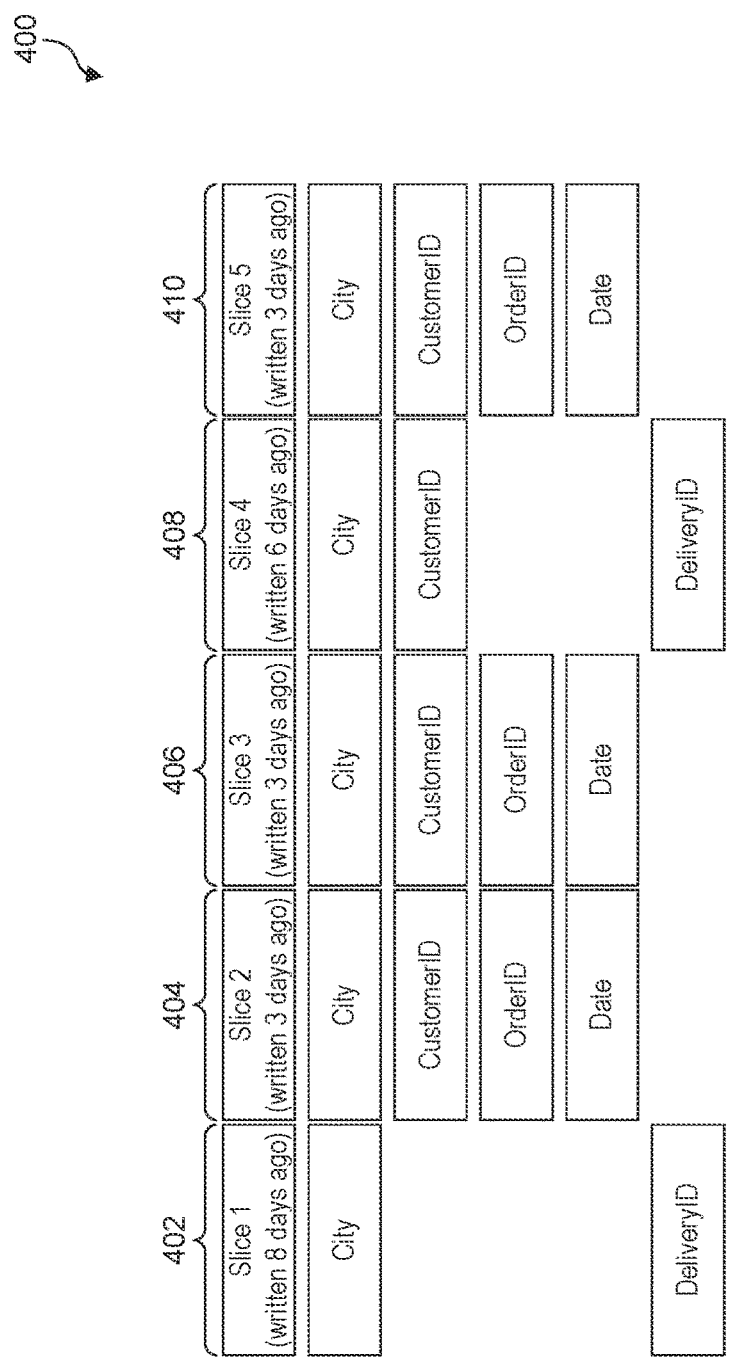
FIG. 4 illustrates an example of a used identifier cache by data slices, according to some embodiments of the disclosure.

FIG. 4 illustrates an example 400 of a used identifier cache by data slices, according to some embodiments of the disclosure. As a convenience and not a limitation. FIG. 4 may be described with regard to elements of FIGS. 1, 2, and 8. The example 400 may represent the operation of devices (e.g., the index server 102, the document store process 104, the bloom filter cache 114, or a combination thereof of FIG. 1) implementing the used identifier cache and the efficient loading operation. The example 400 may also be performed by computer system 800 of FIG. 8. But the example 400 is not limited to the specific embodiments depicted in those figures and other systems may be used to perform the method, as will be understood by those skilled in the art. It is to be appreciated that not all operations may be needed, and the operations may not be performed in the same order as shown in FIG. 4.

In some embodiments, the used identifier cache stores identifiers for each data slice. For example, identifier information illustrated in FIG. 3 may correspond to one data slice. Here, FIG. 4 illustrates identifier information of 5 data slices. Specifically, a cache unit 402 indicates that identifiers "City" and "Delivery ID" were used in a data slice 1. Similarly, cache units 404, 406, 408, and 410 indicate identifiers used in data slices 2-5 respectively. In addition, each cache unit indicates when the identifier information was written to disk using the identifiers that were the most-frequently used ones at the time, according to the used identifier cache. For example, the cache unit 404 indicates that the identifier information of the data slice 2 was written 3 days ago.

In some embodiments, a bloom filter writer, such as the bloom filter writer 110, may write a bloom filter to disk using the most frequently used identifiers at the time. But as requests received by a document store process may vary over time. For example, the requests may be initiated by different users, using different applications, or based on newer application versions. Accordingly, used identifiers of the queries vary. For example, the used identifiers in the WHERE clause may change. In this case, the loading may not be prevented using a bloom filter, as it does not exist or an existing bloom filter does not include one or more used identifiers of the queries received. Hence, the document store process may invalidate bloom filters via a feedback mechanism so that the bloom filter can be re-created using a latest set of the most frequently used identifiers. Also, data slices can be updated and thus data in the data slices may change. In this case, the document store process can invalidate the bloom filters corresponding to the data slices so that queries do not rely on outdated bloom filters.

Figure 5:
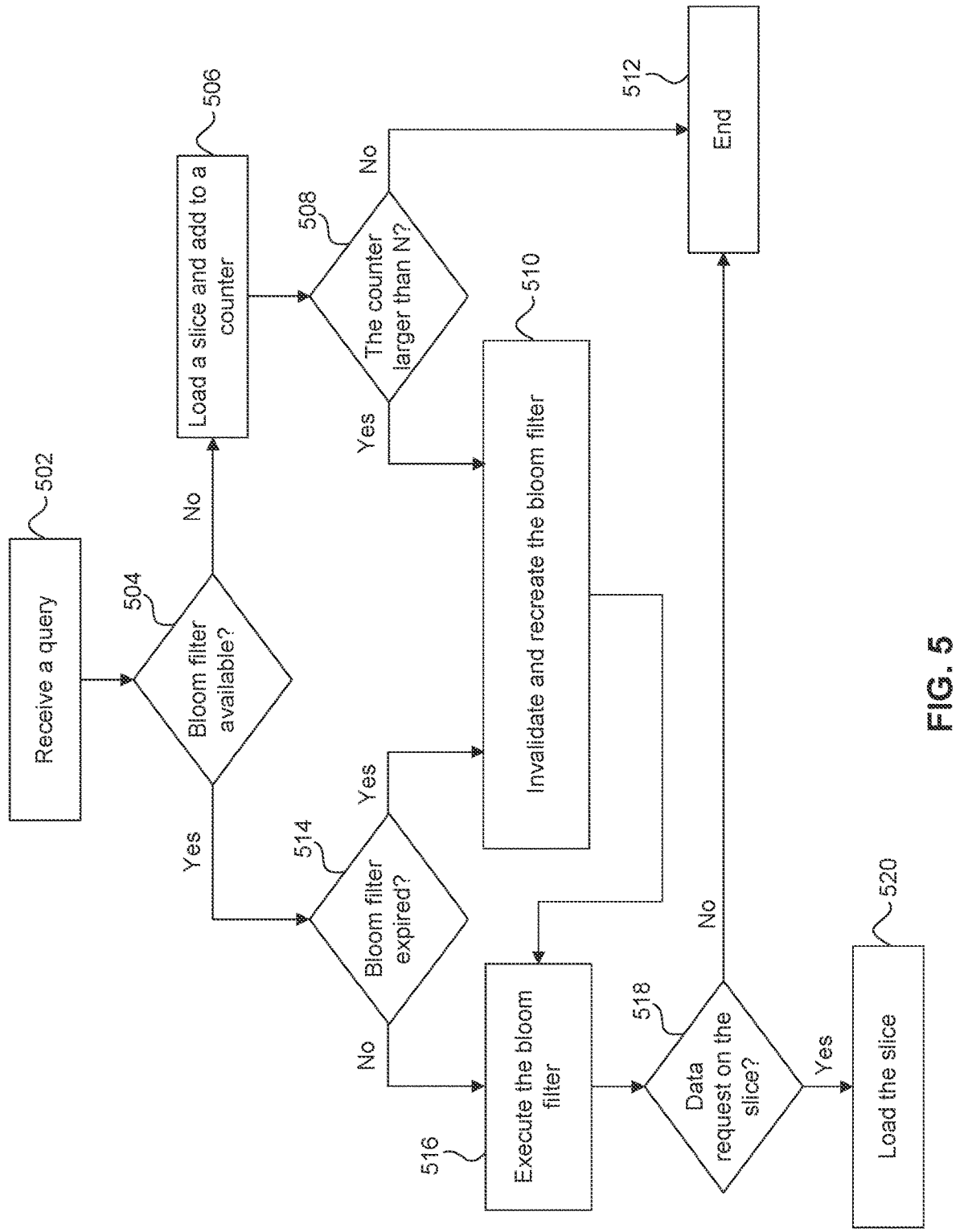
FIG. 5 illustrates an example method of an efficient data slice loading procedure, according to embodiments of the disclosure.

FIG. 5 illustrates an example method 500 of an efficient data slice loading procedure, according to some embodiments of the disclosure. As a convenience and not a limitation, FIG. 5 may be described with regard to elements of FIGS. 1, 2, and 8. The example method 500 may represent the operation of devices (e.g., the index server 102, the document store process 104, the bloom filter cache 114, or a combination thereof of FIG. 1) implementing the used identifier cache and the efficient loading operation. The example method 500 may also be performed by computer system 800 of FIG. 8. But the example method 500 is not limited to the specific embodiments depicted in those figures and other systems may be used to perform the method, as will be understood by those skilled in the art. It is to be appreciated that not all operations may be needed, and the operations may not be performed in the same order as shown in FIG. 5.

At 502, a system, such as the system 100 of FIG. 1, receives a query. The query may indicate data to be retrieved and a data slice that may include the data. The query may also include one or more identifiers of the data. For example, the one or more identifiers may include an identifier "City" to be "New York City." In other words, the data requested by the query correspond to "New York City."

At 504, the system determines whether a bloom filter corresponds to the query is available. In some embodiments, the system may check a bloom filter cache, such as the bloom filter cache 114 in FIG. 1, to determine whether a bloom filter corresponding to the query is available. If no bloom filter corresponding to the data slice of the query is available, the system may determine that no bloom filer is available and the control moves to 506. If a bloom filter corresponding to the data slice is available, the system may further determine whether the bloom filter includes the one or more identifiers of the query. If the bloom filter does not include any of the one or more identifiers, the system may determine that no bloom filter is available and the control still moves to 506.

At 506, the system loads the data slice. For example, a persistence handler, such as the persistence handler 112 in FIG. 1, can load the data slice from a storage, such as the storage 108 of FIG. 1, to a memory of the system. In some embodiments, the persistence handler can check whether the data slice includes the data requested by the query after loading the data slice. If the loaded data slice does include the data requested, the persistence handler can return the data requested to a user or a user device. Otherwise, the persistence handler may return an error message indicating that the data slice does not include the data requested.

In some embodiments, the persistence handler or other elements of the system may create and maintain a bloom filter counter for each data slice. The bloom filter counter starts from 0 and adds 1 each time the system determines that the bloom filter is not available as discussed in 504. Thus, after loading the data slice at 506 as discussed above, the persistence handler may add 1 to the bloom filer counter of the data slice indicated by the query.

At 508, the system determines whether the bloom filter counter is larger than a threshold, such as a number N. If the bloom filter counter is not larger than the threshold, the procedure ends at 512. Otherwise, the control moves to 510.

At 510, the system invalidates the bloom filter if a bloom filter of the data slice exists. For example, the bloom filter cache may include a bloom filter that corresponds to the data slice indicated in the query. However, the bloom filter may not include each of the one or more identifiers indicated by the query. In such a case, the system may invalidate the bloom filter stored in the bloom filter cache and recreate a bloom filter corresponding to the data slices to include the one or more identifiers. In some embodiments, the bloom filter cache may not include any bloom filter corresponding the data slice indicated by the query. In such a case, the system creates a bloom filter that corresponds to the data slice and includes the one or more identifiers.

At 516, the system executes the bloom filter to determine whether the data slice includes the data requested. For example, the query may indicate that the data requested include a "City" identifier to be "New York City." The bloom filter can return results as to whether the data slice includes data with the "City" identifier to be "New York City."

At 518, if the system determines that the data slice does not include the data requested, e.g., no data in the data slice has the "City" identifier as "New York City," the control moves to 512 and the procedure ends. In addition, the system may return an error message to the user or the user device indicating that the data slices do not include the data requested. If the system determines that the data slice does include the data requested, the control moves the 520.

At 520, the persistence handler loads the data slice. In some embodiments, the persistence handler can check whether the loaded data slice includes the data requested by the query. Since the bloom filter may give false positive results, this is still necessary. Furthermore, the persistence handler can return the data requested to the user or the user device if the loaded data slice does include the data requested. Otherwise, the persistence handler may return an error message indicating that the data slice does not include the data requested.

Referring back to 504, the system may determine that a bloom filter is available. For example, the system may determine that a bloom filter in the bloom filter cache corresponds to the data slice indicated by the query and the bloom filter includes the one or more identifiers indicated by the query. In such a case, the control moves to 514.

At 514, the system determines whether the bloom filter has expired. For example, the system may determine that the bloom filter is expired if the bloom filter has not changed for a predetermined period of time, such as 5 days. For another example, the system may determine that the bloom filter is expired if the data slice has changed since the bloom filter was created. For yet another example, the system may determine that the bloom filter is expired if the bloom filter has not changed for the predetermined period of time and the data slice has changed within the predetermined period of time. In any cases above, the control moves to 506 and the system may load the data slice as discussed above. On the other hand, the system may determine that the bloom filter is not expired. For example, the bloom filter may be created or recreated within the predetermined time period or the data slice has not changed since the bloom filter was created. In either case, the control moves to 516.

Figure 6:
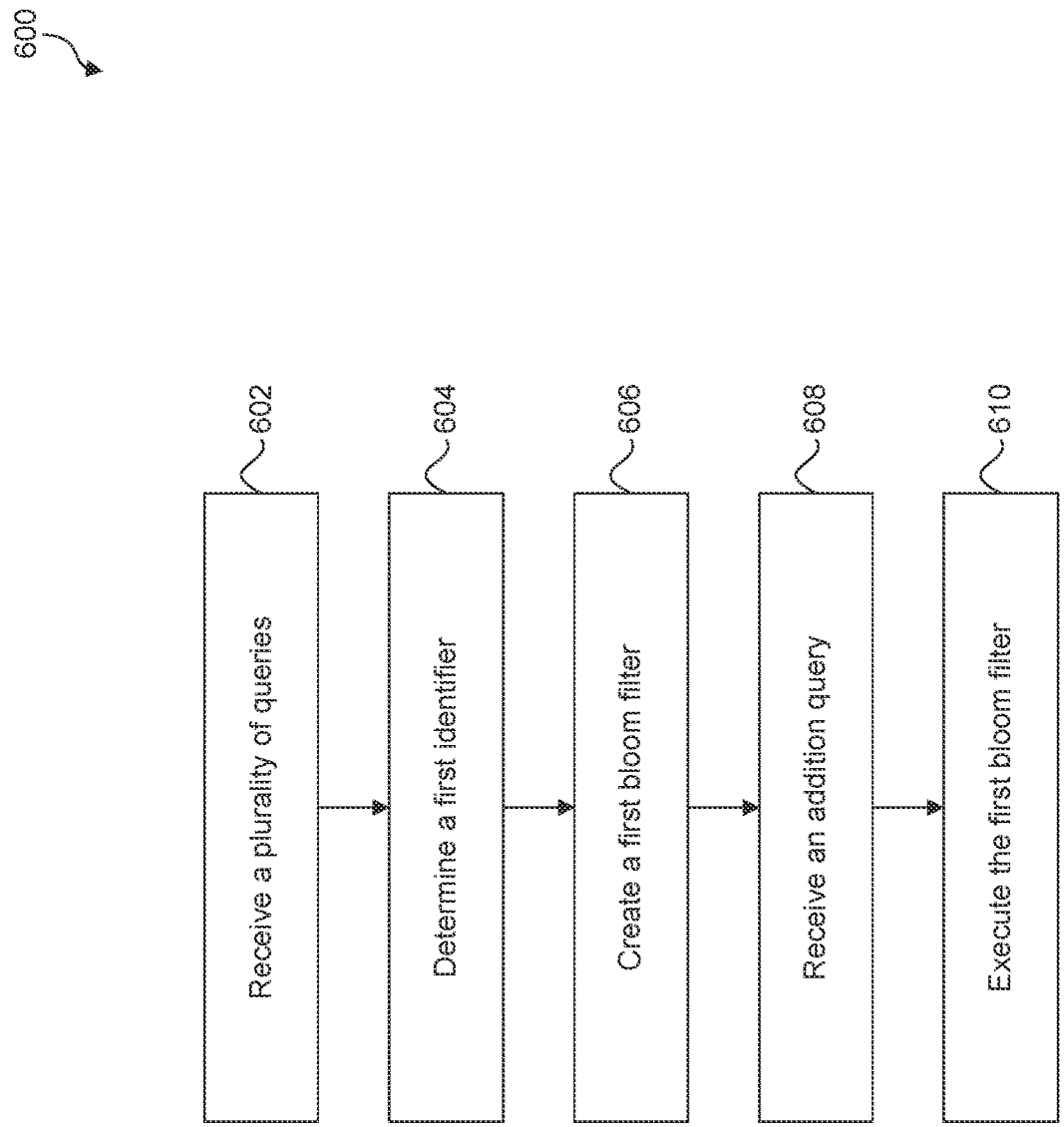
FIG. 6 illustrates an example method of creating a bloom filter based on an identifier, according to embodiments of the disclosure.

FIG. 6 illustrates an example method 600 of creating a bloom filter based on an identifier, according to some embodiments of the disclosure. As a convenience and not a limitation, FIG. 6 may be described with regard to elements of FIGS. 1, 2, and 8. The example method 600 may represent the operation of devices (e.g., the index server 102, the document store process 104, the bloom filter cache 114, or a combination thereof of FIG. 1) implementing the used identifier cache and the efficient loading operation. The example method 600 may also be performed by computer system 800 of FIG. 8. But the example method 600 is not limited to the specific embodiments depicted in those figures and other systems may be used to perform the method, as will be understood by those skilled in the art. It is to be appreciated that not all operations may be needed, and the operations may not be performed in the same order as shown in FIG. 6.

At 602, a system, such as the system 100 of FIG. 1, receives a plurality of queries. The plurality of queries may each indicates a data slice and one or more identifiers.

At 604, the system determines a first identifier based on the plurality of queries. In some embodiments, the plurality of queries may correspond to one or more identifiers. For example, the plurality of queries may correspond to five identifiers. Each of the five identifiers corresponds to a number of queries. Specifically, a first number of queries correspond to the first identifier; a second number of queries correspond to a second identifier; a third number of queries correspond to a third identifier; a fourth number of queries correspond to a fourth identifier; and a fifth number of queries correspond to a fifth identifier. In some embodiments, the first number is larger than any of the second, the third, the fourth, and the fifth numbers. In other words, the first identified is the most used identifier among the identifiers of the plurality of queries. In other embodiments, the system may determine that the first identifier based on that the first number is larger than a threshold. For example, the threshold can be a predetermined number of queries. In some embodiments, the system can store the first identifier in a memory of the system.

At 606, the system creates a first bloom filter based on the first identifier.

At 608, the system receives an additional query that also corresponds to the first identifier. For example, the first identifier may be "City." The second query may request data that have a "City" as "New York City".

At 610, the system executes the first bloom filter. In some embodiments, the first bloom filter can indicate whether the data slice includes the data requested, e.g., data that have a "City" as "New York City."

Figure 7:
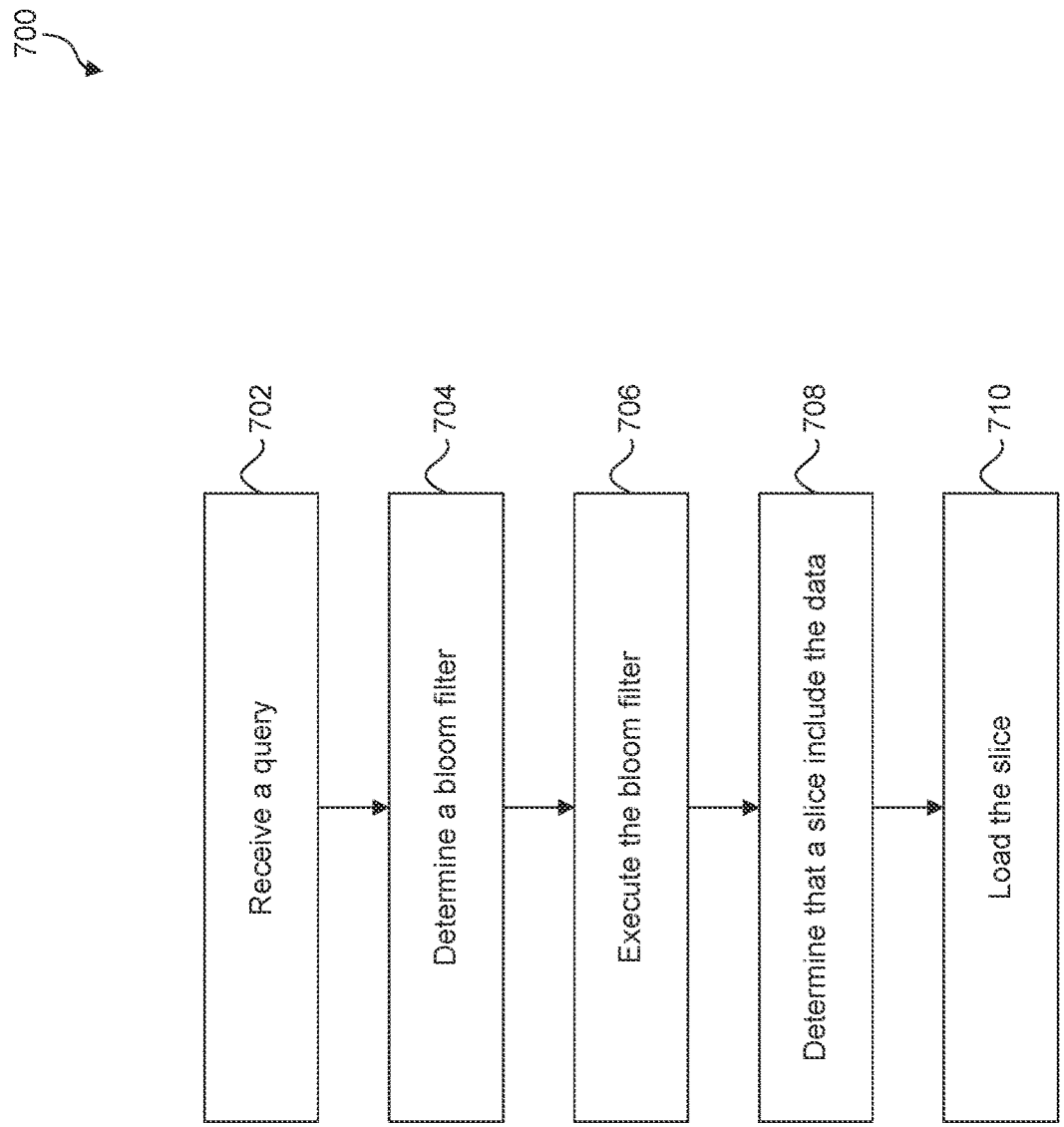
FIG. 7 illustrates an example method of loading data slices based on a bloom filter, according to embodiments of the disclosure.

FIG. 7 illustrates an example method 700 of loading data slices based on a bloom filter, according to some embodiments of the disclosure. As a convenience and not a limitation, FIG. 7 may be described with regard to elements of FIGS. 1, 2, and 8. The example method 700 may represent the operation of devices (e.g., the index server 102, the document store process 104, the bloom filter cache 114, or a combination thereof of FIG. 1) implementing the used identifier cache and the efficient loading operation. The example method 700 may also be performed by computer system 800 of FIG. 8. But the example method 700 is not limited to the specific embodiments depicted in those figures and other systems may be used to perform the method, as will be understood by those skilled in the art. It is to be appreciated that not all operations may be needed, and the operations may not be performed in the same order as shown in FIG. 7.

At 702, the system receives a query. In some embodiments, the query may indicate a data slice and one or more identifiers.

At 704, the system determines a bloom filter that corresponds to the data slice and includes the one or more identifiers. The bloom filter may be stored in a bloom filter cache and the system may check the bloom filter cache to determine whether the bloom filter is available.

At 706, the system executed the bloom filter. In some embodiments, if the bloom filter is not available or is expired, the system can invalidate and recreate the bloom filter, as discussed above. Afterward, the system can execute the recreated bloom filter.

At 708, the system can determine whether the data slice includes the data requested by the query.

At 710, the system can load the data slice when the data slice includes the data requested by the query. Otherwise, the system can return an error message indicating that the data slice does not include the data requested.

Figure 8:
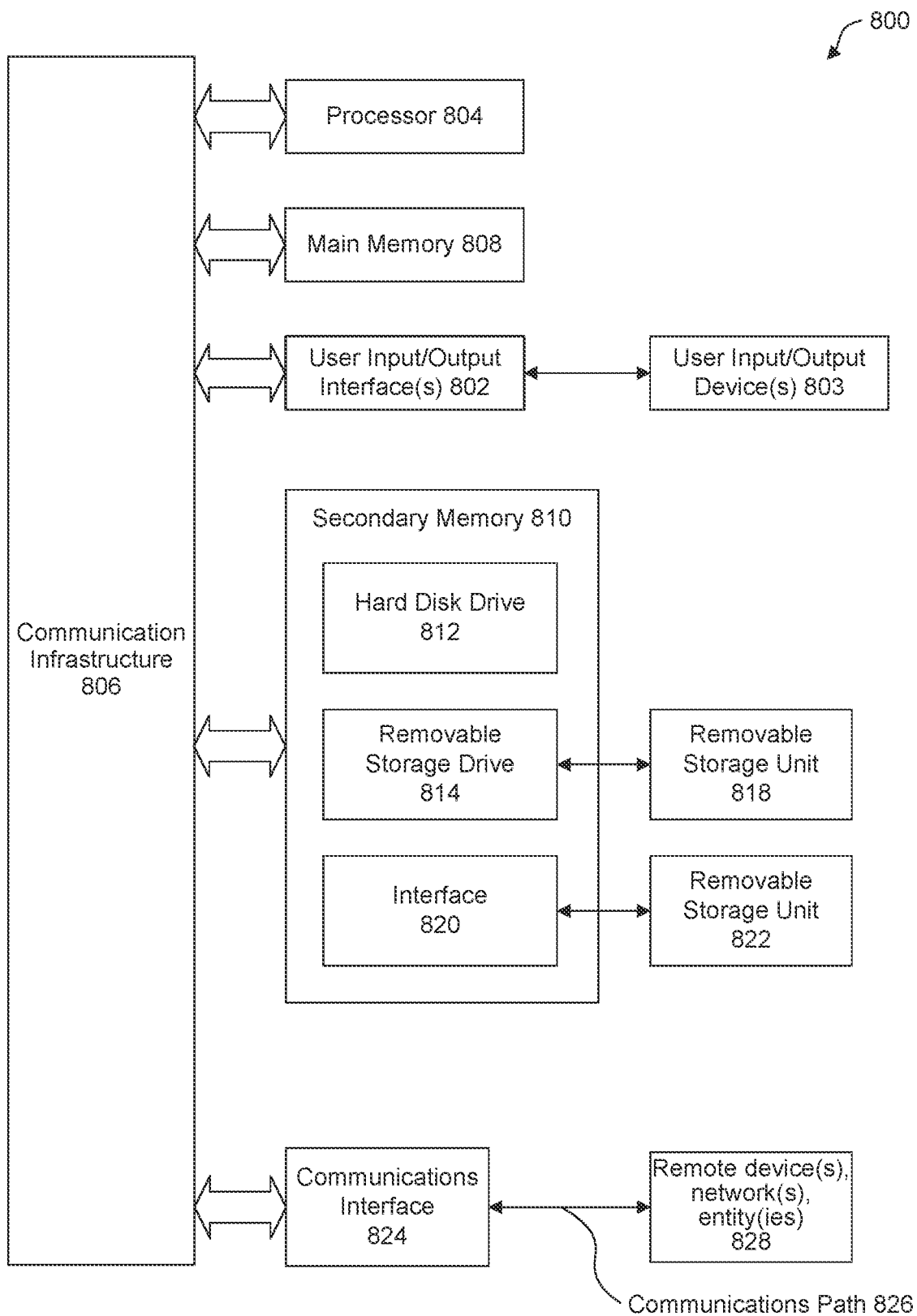
FIG. 8 is an example computer system for implementing some embodiments of the disclosure or portion(s) thereof.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A database management system, comprising:
   a memory; and
   at least one processor coupled to the memory and configured to:
   receive a query to retrieve data that corresponds to a data slice, wherein the query includes one or more identifiers, wherein the one or more identifiers correspond to one or more data properties included in the data slice;
   determine whether a bloom filter includes the one or more identifiers based on the query;
   in response to determining that the bloom filter includes the one or more identifiers, determine that the data slice includes the data requested by the query based on the bloom filter; and
   in response to determining that the data slice includes the data requested by the query, load the data slice to the memory.

2. The database management system of claim 1, wherein the at least one processor is further configured to:
   receive a second query that corresponds to a second data slice;
   determine that no bloom filter is available for the second query; and
   in response to determining that no bloom filter is available, load the second data slice to the memory.

3. The database management system of claim 2, wherein to determine that no bloom filter is available, the at least one processor is further configured to determine that no bloom filter corresponds to the second data slice.

4. The database management system of claim 2, wherein to determine that no bloom filter is available, the at least one processor is further configured to:
   determine that a second bloom filter corresponds to the data slice;
   determine that the second query indicates an identifier; and
   determine that the second bloom filter does not correspond to the identifier.

5. The database management system of claim 4, wherein the at least one processor is further configured to:
   in response to determining that the second bloom filter does not correspond to the identifier, add 1 to a bloom filter counter of the second bloom filter;
   determine that the bloom filter counter is more than a threshold; and
   invalidate the bloom filter.

6. The database management system of claim 5, wherein the at least one processor is further configured to create a new bloom filter for the second data slice, wherein the new bloom filter corresponds to at least the identifier.

7. The database management system of claim 1, wherein the at least one processor is further configured to:
   receive a further query corresponding to a further data slice;
   determine a further bloom filter based on the further query;
   determine that the further data slice does not include data requested by the further query based on the further bloom filter; and
   in response to determining that the further data slice does not include the data requested by the further query, refrain from loading the further data slice to the memory.

8. The database management system of claim 1, wherein the at least one processor is further configured to:
   determine a change on the data slice within a predetermined time period; and
   invalidate the bloom filter.

9. A computer-implemented method for loading operations, comprising:
   receiving a query to retrieve data that corresponds to a data slice, wherein the query includes one or more identifiers, wherein the one or more identifiers correspond to one or more data properties included in the data slice;
   determining whether a bloom filter includes the one or more identifiers based on the query;
   in response to determining that the bloom filter includes the one or more identifiers, determining that the data slice includes the data requested by the query based on the bloom filter; and
   in response to determining that the data slice includes the data requested by the query, loading the data slice to a memory.

10. The computer-implemented method of claim 9, further comprising:
    receiving a second query that corresponds to a second data slice;
    determining that no bloom filter is available for the second query; and
    in response to determining that no bloom filter is available, loading the second data slice to the memory.

11. The computer-implemented method of claim 10, wherein the determining that no bloom filter is available further comprises determining that no bloom filter corresponds to the second data slice.

12. The computer-implemented method of claim 10, wherein the determining that no bloom filter is available further comprises:
    determining that a second bloom filter corresponds to the data slice;
    determining that the second query indicates an identifier; and
    determining that the second bloom filter does not correspond to the identifier.

13. The computer-implemented method of claim 12, further comprising:
    in response to determining that the second bloom filter does not correspond to the identifier, adding 1 to a bloom filter counter of the second bloom filter;

determining that the bloom filter counter is more than a threshold; and invalidating the bloom filter.

14. The computer-implemented method of claim 13, further comprising creating a new bloom filter for the second data slice, wherein the new bloom filter corresponds to at least the identifier.

15. The computer-implemented method of claim 9, further comprising:

receiving a further query corresponding to a further data slice;

determining a further bloom filter based on the further query;

determining that the further data slice does not include data requested by the further query based on the further bloom filter; and in response to determining that the further data slice does not include the data requested by the further query, refraining from loading the further data slice to the memory.

16. The computer-implemented method of claim 9, further comprising:

determining a change on the data slice within a predetermined time period; and invalidating the bloom filter.

17. A non-transitory computer-readable device having instructions stored thereon that, when executed by at least one computing device, cause the at least one computing device to perform operations, the operations comprising:

receiving a query to retrieve data that corresponds to a data slice, wherein the query includes one or more identifiers, wherein the one or more identifiers correspond to one or more data properties included in the data slice;

determining whether a bloom filter includes the one or more identifiers based on the query;

in response to determining that the bloom filter includes the one or more identifiers, determining that the data slice includes the data requested by the query based on the bloom filter; and in response to determining that the data slice includes the data requested by the query, loading the data slice to a memory.

18. The non-transitory computer-readable device of claim 17, wherein the operations further comprises:

receiving a second query that corresponds to a second data slice;

determining that no bloom filter is available for the second query; and in response to determining that no bloom filter is available, loading the second data slice to the memory.

19. The non-transitory computer-readable device of claim 18, wherein the determining that no bloom filter is available further comprises determining that no bloom filter corresponds to the second data slice.

20. The non-transitory computer-readable device of claim 18, wherein the determining that no bloom filter is available further comprises:

determining that a second bloom filter corresponds to the data slice;

determining that the second query indicates an identifier; and determining that the second bloom filter does not correspond to the identifier.

* * * * *